United States Patent [19]
Maracchi

[11] Patent Number: 5,427,143
[45] Date of Patent: Jun. 27, 1995

[54] GAS FLOW AND PRESSURE REGULATION AND CONTROL STATION

[76] Inventor: Giorgio Maracchi, Apártado No. 1313, Maracaibo, Edo. Zulia, Venezuela

[21] Appl. No.: 231,426

[22] Filed: Apr. 22, 1994

[51] Int. Cl.$^6$ ............................................. F16K 31/12
[52] U.S. Cl. .................... 137/613; 137/312; 137/505.47; 137/559
[58] Field of Search .................... 137/505.47, 613, 312, 137/559

[56] References Cited

U.S. PATENT DOCUMENTS

| | | | |
|---|---|---|---|
| 863,528 | 8/1907 | Fulton | 137/505.47 |
| 1,104,865 | 7/1914 | Barrington, Jr. | 137/505.47 |
| 2,095,426 | 10/1937 | Van Epps | 137/505.47 |
| 3,623,506 | 11/1971 | Bonner et al. | 137/613 |
| 3,885,590 | 5/1975 | Ford et al. | 137/613 |
| 4,565,207 | 1/1986 | Sherrod | 137/557 |
| 4,665,945 | 5/1987 | Suzuki | 137/613 |

*Primary Examiner*—A. Michael Chambers
*Attorney, Agent, or Firm*—Malloy & Malloy

[57] ABSTRACT

A gas flow and pressure regulation and control station to be connected directly between a distribution line of an urban gas distribution network and a user service line, the station including an inlet connector to be connected directly to the distribution line, an outlet level connector disposed in fluid flow communication with the inlet connector and having an axial flow through passage wherethrough controlled levels of gas pass, and an intermediary connection having a flow regulator member which pivotally moves between a normal flow stopping orientation that prevents gas from passing from the outlet level connector to the intermediary connection, and a flow passage orientation, pivotal movement occurring if the pressure of gas flowing through the outlet level connector and contacting a stopper end of the flow regulator member is sufficient because predetermined gas flow and pressure levels which are to be maintained in the intermediary connection have sufficiently dropped such that a regulator diaphragm, which is connected by a pivot rod to a lever end of the flow regulator member, is allowed to move, thereby allowing the flow regulator member to pivotally move allowing gas into the intermediary connection until the predetermined tolerable flow and pressure levels, as set through regulating movement of the regulator diaphragm, is reattained for passage to a user service line through a delivery connector.

14 Claims, 2 Drawing Sheets

GAS FLOW AND PRESSURE REGULATION AND CONTROL STATION

BACKGROUND OF THE INVENTION

1. Field of the Invention

The present invention relates to a gas flow and pressure regulation and control station which is to be connected directly between a distribution line of an urban gas distribution network and a user service line, thereby eliminating the need for intermediary control stations to reduce flow and pressure quantities, and allowing for direct connection with the gas distribution network at a sidewalk junction box while still providing the necessary flow and pressure regulation to meet the needs of a user.

2. Description of the Related Art

Generally, most urban gas systems include a main station to which are connected the main gas line and main distribution branches. At this main station, pressure is reduced from about 500 manometric pounds per square inch (psig) to 250 psig. Still, however, those levels are not yet adequate for independent domestic or commercial use. In particular, industrial users require special industrial connectors which measure the flow rate and further regulate the pressure by lowering additional quantities to 90 psig, a useable industrial level. In the case of domestic distribution, a domestic distribution network is maintained which originates from a district plant. These district plants lower the pressure levels from the 250 psig to 60 psig and at this pressure, feed the domestic distribution gas line for the single and multi-family units. Finally, at the point of use, the domestic users and most commercial establishments require pressure of approximately 0.5 psig. In order to properly set up the domestic distribution networks, a large number of steps must be taken in order to achieve proper flow and pressure levels of the gas and in order to effectively distribute the gas to an individual user. Further, in addition to the connections, individual gas flow shutoffs and maximum flow rate controls must be implemented, as well as separate pressure regulators to ensure that an appropriate pressure has in fact been achieved. Accordingly, it would be highly beneficial to provide a gas flow and pressure regulation and control station which can be connected directly in the street to the distribution line of the gas distribution network, and which function to provide for shutting off and opening of the gas flow, controlling the maximum gas flow rate and regulating the pressure, in a single defective unit.

SUMMARY OF THE INVENTION

The present invention is directed towards a gas flow and pressure regulation and control station which is to be connected directly between a distribution line of an urban gas distribution network and a user service line. In particular, the station will include an inlet connector which is secured in fluid flow engagement with the distribution line. This inlet connector must be secured in a leak-resistant manner so as to provide for safe and effective gas flow from the distribution line into the station. Connected in fluid flow communication with the inlet connector is an outlet level connector. This outlet level connector, which has an axial flow through passage with a first end and a second end, is structured to allow controlled levels of gas to pass therethrough from its first end to its second end. Connected in leak-resistant, fluid flow communication with the user service line is a delivery connector. This delivery connector is structured to deliver regulated quantities of the gas to the user's service line for eventual use. Connected between the outlet level connector and the delivery connector is an intermediary connector. This intermediary connector includes an expansion chamber and includes regulating means positioned therein. Those regulating means are particularly adapted to limit and control the gas flow and gas pressure passing to the delivery connector, thereby ensuring that a predetermined tolerable flow and pressure level of gas into the user delivery line is maintained in accordance with a maximum flow rate of gas to be allowed. Included as part of the regulating means is a flow regulation member. This flow regulation member is positioned adjacent the second end of the outlet level connector and is structured to pivotally move between a normal flow stopping orientation and a flow passage orientation. Accordingly, the flow regulator member includes a stopper end and a lever end, the stopper end being positioned in contacting, flow stopping relation with the second end of the outlet level connector when the flow regulation member is positioned in its normal flow stopping orientation. Upon this connecting engagement by the stopper with the second end of the outlet level connector, gas flow out of the second end of the outlet level connector is blocked. In order to enable the flow regulator member to pivotally move from its normal flow stopping orientation to the flow passage orientation, pivot means are included. These pivot means are structured such that this pivotal movement into the flow passage orientation will result upon a gas flow and pressure reduction within the intermediary connection due to the passage of gas through the delivery connector into the user's delivery line. Pivoting occurs in such a manner that small, regulated quantities of gas can flow from the outlet level connector into the intermediary connector until the predetermined tolerable flow and pressure level is reattained in the intermediary connection and the flow regulator member pivots back into its normal flow stopping orientation. Also included as part of the regulating means are level adjustment means which enable a gas supplier to adjust the tolerable flow and pressure levels of gas in order to achieve the desired maximum flow rate based upon a main line supply pressure. Those level adjustment means includes a pivot rod, with a distal end pivotally secured to the level end of the flow regulating means. This pivot rod is secured in such a manner such that pivotal movement of the flow regulator member will result in axial movement of the pivot rod as well. Also included as part of the level adjustment means is a regulator diaphragm. This regulator diaphragm is disposed within the expansion chamber of the intermediary connection such that the regulator diaphragm may function in an atmosphere of closed venting. This regulator diaphragm is fixedly secured to the pivot rod in such a manner that it will resist and regulate axial movement of the pivot rod and accordingly pivoting movement of the flow regulating member. In particular, the regulating diaphragm controls the axial movement of the pivot rod predetermined quantities based upon the flow and pressure levels of gas which are attained in the intermediary connection. In order to adjust what those predetermined quantities will be, adjustable tension biasing means are disposed within the intermediary connection and secured to the regulator diaphragm. These adjustable tension biasing means will adjustably control the gas flow and pressure reduction in the intermediary connection which is necessary to enable axial movement of the pivot rod and accordingly pivoting movement of the flow regulator member from its flow stopping orientation. In particular, the regulator diaphragm, as adjusted, will allow slight amounts of axial movement of the pivot rod which will result in the pivoted movement of the flow regulator member such that small, particularly regulated quantities of gas flow will exit the outlet level connector into the intermediary connection. Upon sufficient gas flowing from the outlet level connector into the intermediary connector such that the predetermined tolerable flow and pressure level is attained within the intermediary connection, axial movement of the pivot rod is resisted thereby maintaining the flow regulator member in its flow stopping orientation.

It is an object of the present invention to provide gas flow and pressure regulation and control station which can enable direct connection between a distribution line of an urban gas distribution network and a user service line, without requiring additional domestic regulation stations to be implemented before gas can be distributed to the individual users.

Still another object of the present invention is to provide a gas flow and pressure regulation and control station which can be connected directly between a distribution line of an urban gas distribution network and a user service line and which will provide, in one single unit, the means to shut off an open gas flow, control the maximum gas flow rate, and regulate the gas flow pressure which is allowed to pass into the user's service line.

Still another object of the present invention is to provide a gas flow and pressure regulation and control station which can be secured directly at a sidewalk junction box so as to provide an accessible and easily controllable regulation and control station.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENTS

Figure 1:
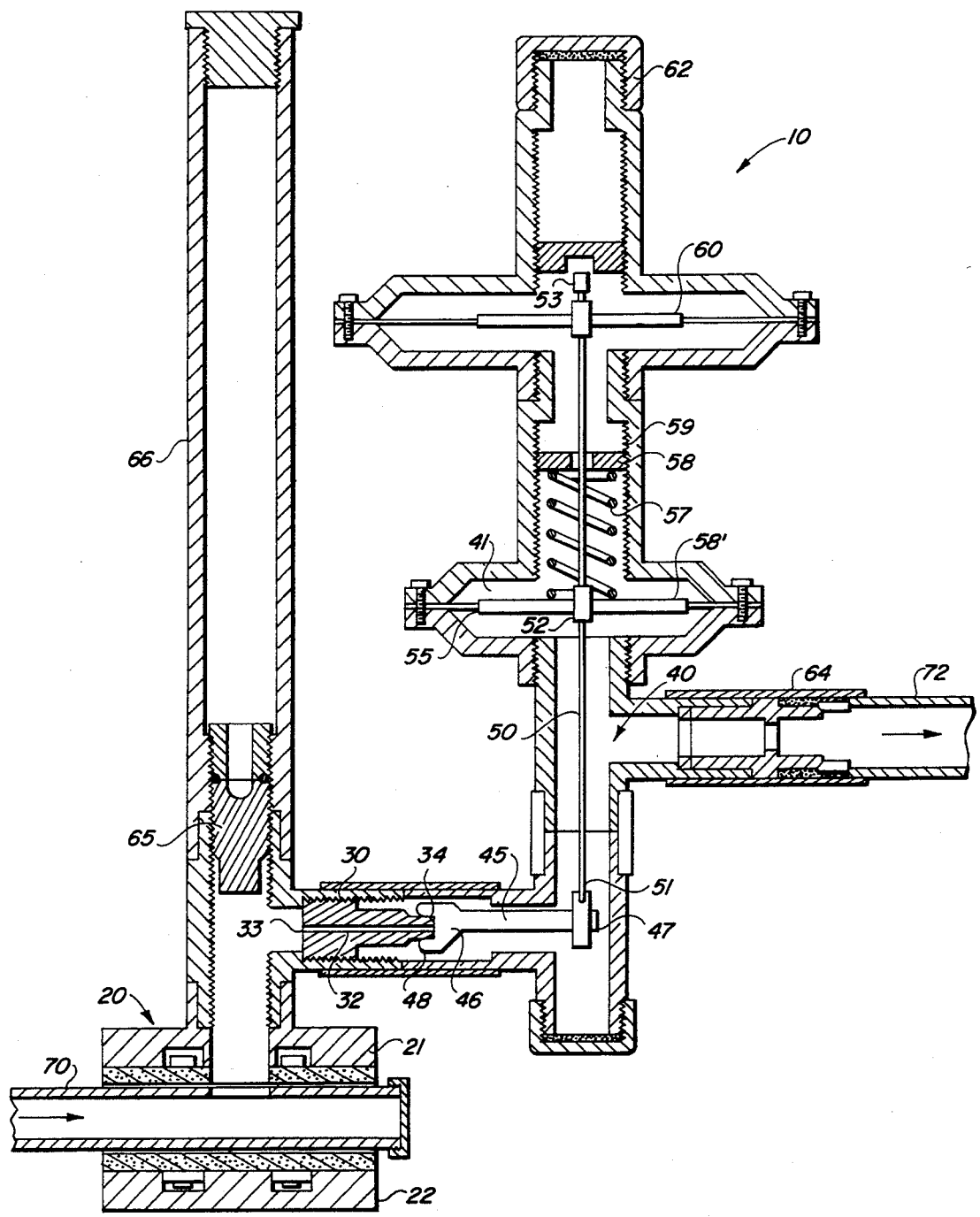
FIG. 1 is a side, cross-section view of the station of the present invention.

Shown throughout the figures, the present invention is directed towards a gas flow and pressure regulation and control station, generally indicated as 10. The regulation and control station 10 is adapted to be positioned between a distribution line 70 of an urban gas distribution network and a user service line 72 so as to provide regulated pressure and flow conditions into the user.

Included as part of the regulation and control station 10 is an inlet connector 20 which is secured to the distribution line 70 so as to enable gas to pass from the distribution line 70 into the regulation and control station 10. Preferably, this inlet connector 20 includes a pair of clamp members 21 and 22 which are clampingly and hermetically sealed about the gas distribution line 70. Accordingly, in the preferred embodiment, the distribution line 70 need not have a specially tailored or adapted fitting, but rather is laid in between the clamping members 21 and 22 and includes an opening formed therein where through gas exits the distribution line 70. The gas then enters the regulation and control station 10 through a flow through passage included in one of the clamping members 21. Once the gas enters the regulation and control station 10 through the inlet connector 20, it is directed towards an outlet level connector 30. This outlet level connector 30 is positioned such that all gas flowing through the regulation and control station 10 must pass therethrough, and includes a substantially narrow, axial flow through passage 32. This flow through passage 32 includes a first end 33 and a second end 34, and is sized such that only controlled levels of gas can pass therethrough into an intermediary connection 40.

The intermediary connection 40 includes an expansion chamber 41 and has regulating means disposed therein. The regulating means are adapted to limit and control the gas flow and gas pressure passing from the regulation and control station 10 to the user service line 72 and ensure that a predetermined tolerable flow and pressure level of gas corresponding a maximum flow rate based upon the main line supply pressure into the user service line 72 is maintained. Included as part of the regulating means is a flow regulator member 45. This flow regulator member 45 is hingedly secured in position adjacent the second end 34 of the outlet level connector 30 and is adapted to pivotally move between a normal flow stopping orientation and a flow passage orientation. The flow regulator member 45 includes a stopper end 46 and a lever end 47, the stopper end 46 being positioned in contacting, flow stopping relation with the second end 34 of the outlet level connector 30 when the flow regulator member 45 is positioned in its normal flow stopping orientation. Specifically, the stopper end 46 will abut the outlet level connector 30 so as to cover the second end 34 of the axial flow through passage 32 and prevent the passage of gas therethrough when the flow regulator member 45 is positioned in its normal flow stopping orientation. In order for the flow regulator member 45 to pivotally move from its normal, flow stopping orientation to its flow passage orientation, pivot means are included. These pivot means preferably include a hinged connection 48 which secures the flow regulator member 45 pivotally in place within the intermediary connection 40. Further, the pivot means enable the flow regulator member 45 to be secured such that upon a gas flow and pressure reduction in the intermediary connection 40, which results from the passage of gas out to the user delivery line 72, the flow build-up through the axial flow through passage 32 of the outlet level connector 30 will push upon the stopper end 46 of the flow regulator member 45 causing it to pivot and allowing small, regulated quantities of gas flows from the outlet level connector 30 into the intermediary connection 40. These small, regulated quantities of gas flow are allowed only until the predetermined tolerable flow and pressure level is reattained within the intermediary connection 40, thereby resulting in a pressure equalization on the intermediary connection side of the flow regulator member 45. When this equilibrium is attained the flow regulator member 45 will pivot back to its normal, flow stopping orientation because the gas flow build-up within the axial flow through passage 32 of the outlet level connector 30 is no longer sufficient to pivot the flow regulator member 45.

In order to allow a gas supplier to adjust the tolerable flow and pressure levels of gas which enter the user service line 72 to correspond the maximum flow rate within the particular needs of the user, the regulating means further include level adjustment means. These level adjustment means include a pivot rod 50, which is preferably disposed perpendicular to the flow regulator member 45, and includes a distal end 51 which is hingedly secured to the lever end 47 of the flow regulating member 45. The pivot rod 50 and flow regulator member 45 are secured to one another such that pivotal movement of the flow regulator member 45 will result in axial movement of the pivot rod 50, and accordingly, restricting the movement of the pivot rod 50 will in turn restrict pivotal movement of the flow regulator member 45. In order to facilitate this calculated adjustment of the tolerable flow and pressure levels of gas corresponding the maximum flow rate which are allowed to exit the regulation and control station, the level adjustment means further includes a regulator diaphragm 55. This regulator diaphragm is positioned within the expansion chamber 41 of the intermediary connection 40 such that the regulator diaphragm 55 will be able to function in an atmosphere of closed venting as is present within the regulation and control station 10. This regulator diaphragm 55 is secured about a perimeter thereof within the intermediary connection 40, and is also fixedly secured to the pivot rod 50 in such a manner as to resist and regulate axial movement of the pivot rod 50, and accordingly, pivoting movement of a flow regulating member 45. In particular, when the desired predetermined tolerable flow and pressure levels of gas are present within the intermediary connection 40, movement of the diaphragm 55, in such a manner that would allow axial movement of the pivot rod 50 and pivoted movement of the flow regulation member 45, is prevented. When, however, the predetermined tolerable flow and pressure levels of gas within the intermediary connection 40 drop as a result of gas exiting the regulation and control station 10 to the user service line 72, the regulator diaphragm 55 is able to move thereby making the flow pressure exerted on the stopper end 46 of the flow regulation member 45 from the gas passing into the axial flow through passage 32 of the outlet level connector 30 sufficient to result in pivoted movement of the flow regulation member 45. After the gas flow is allowed into the intermediary connection 40, the flow and pressure levels of gas within the intermediary connection 40 will begin to increase until eventually the predetermined tolerable flow and pressure levels of gas are reobtained and movement of the regulator diaphragm 55 is restricted resulting in the flow regulation member 45 remaining in its flow stopping orientation.

To permit selective adjustment of the predetermined tolerable flow and pressure level of gas which attain the maximum flow rate based upon the main line supply pressure, adjustable tension biasing means are disposed within the intermediary connection 40 and secured to the regulator diaphragm 55. Preferably, these adjustable tension biasing means includes a spring 57 with a distal end 58 and a proximal end 58'. The proximal end 58' of the spring is secured to the regulator diaphragm 55 and the distal end 58 is secured to an adjustment member 59 adjustably secured within the intermediary connection 40. In particular, the adjustment member 59 includes a disk which is threadedly secured within the intermediary connection 40 and has an opening therein wherethrough the pivot rod 50 may pass. By moving the adjustment member 59 closer or farther from the regulator diaphragm 55, the resulting change in tension on the spring 57 which is connected to the regulator diaphragm 55 results in a corresponding adjustment of the predetermined tolerable flow and pressure levels of gas that must be maintained if the regulator diaphragm 55 is to resist movement. Further, for added safety, the station 10 includes a second, backup diaphragm 60 connected to the pivot rod 50. In particular, the regulator diaphragm 55 is connected to the pivot rod 50 at a central portion 52 of the pivot rod 50, however, the second, backup diaphragm 60 is preferably connected substantially at a proximal end 53 of the pivot rod 50. The second, backup diaphragm 60 is positioned such that if the regulator diaphragm 55 ruptures, the second, backup diaphragm 60 will begin to function to allow minimal pivoting movement of the flow regulator member 45 from its flow stopping orientation. Accordingly, when the second backup diaphragm 60 is functioning, unwanted or dangerously high flow and pressure levels of gas cannot enter the user service line 72 and a warning to a user is provided that the regulator diaphragm 55 has ruptured because of the low flow and pressure levels of gas which are permitted to flow to the user service line 72. Also, the back-up diaphragm 60 acts as hermetic sealing, sealing the intermediary connection 40 below it, so as to separate and protect it from exterior conditions above the back-up diaphragm 60. Specifically, the intermediary connection 40 may include an access 62 above the back-up diaphragm 60, which may be partially or totally open, to allow facilitated repair or replacement of the diaphragms. Also, the intermediary connection 40 may be otherwise segmented to assist repair and replacement therein.

Disposed between this intermediary connection 40 and the user service line 72 is a delivery connector 64. This delivery connector 64 is secured in fluid flow communication with the user service 72 line such that the regulated flow and pressure levels of gas achieved within the intermediary connection 40 can pass therethrough for use by the user.

Also, in a preferred embodiment, a stopper member 65 is disposed between the inlet connector 20 and the outlet level connector 30 to function as shut off means. This stopper member 65 is movably positioned, preferably through exterior threading, to slide into flow blocking position between the inlet connector 20 and the outlet level connector 30, thereby effectively shutting down gas supply to the user such as may be required in an emergency situation. Extending upwardly from between the inlet connector 20 and the outlet level connector 30, in order to facilitate exterior access to the stopper member 65, is an elongate access tube 66. The access tube 66, which includes an independent closure, provides a conveniently positionable guide to the stopper member 65.

Figure 2:
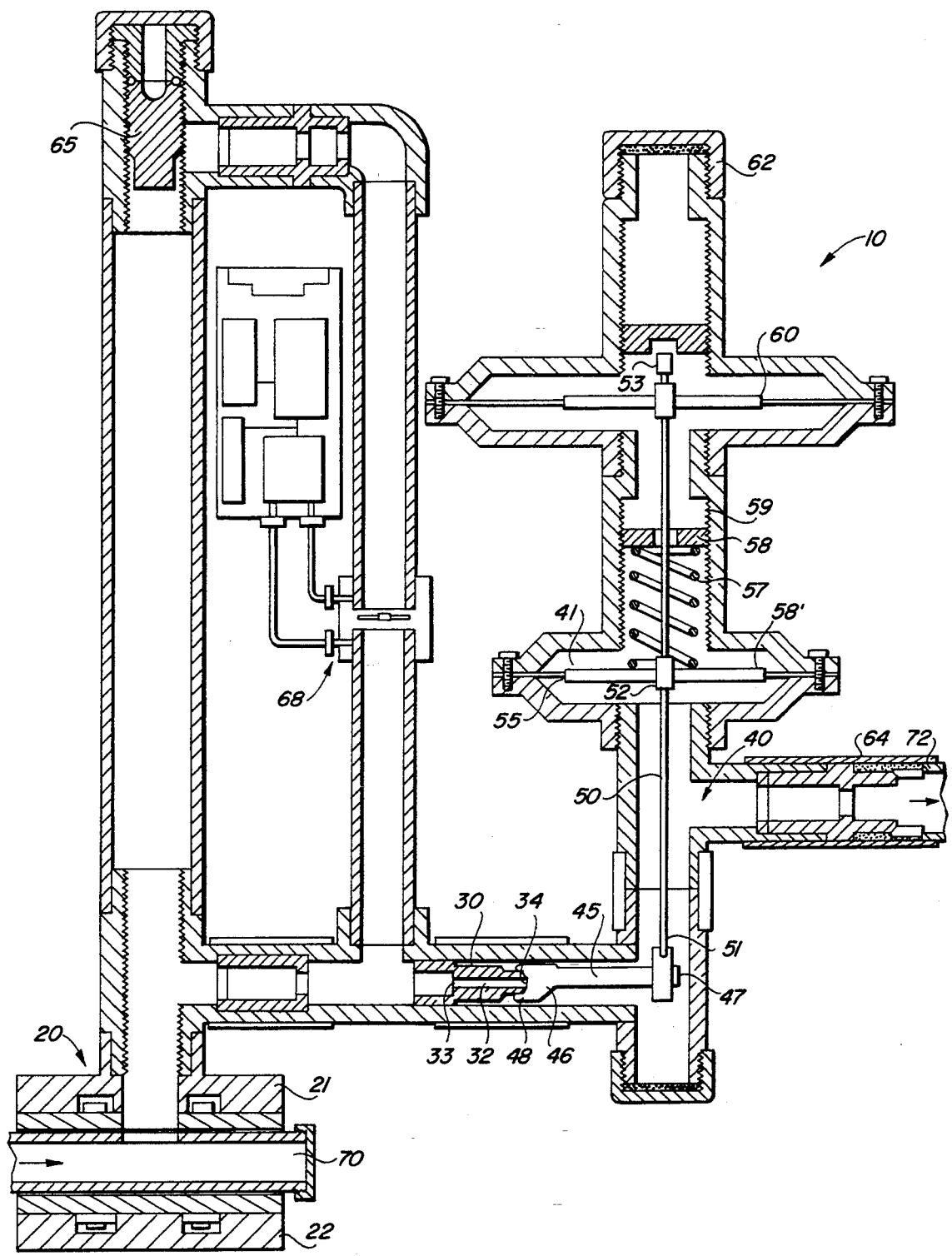
FIG. 2 is a side, cross-section view of a second embodiment of the station of the present invention.

The station 10 of the present invention, in an alternative embodiment as shown in FIG. 2, may include metering means 68 in order to allow a user or a gas supply company to calculate the amount of gas being used. Preferably, these metering means 60 are disposed in fluid flow communication between the inlet connector 20 and the outlet level connector 30 downstream of the stopper member 65. The metering means 68 can be conventional flow metering means which measure the actual quantity of gas The station 10 of the present invention, although it can be secured above ground at an installation site, is adapted such that it may be easily and conveniently disposed below ground in a location near the distribution line 70 of the urban gas distribution network. In this manner, added lines need not be implemented from the urban gas distribution network distribution line. Similarly, the station 10 can be oriented, or in particular the elongate access tube 66 to the stopper member 65 can be angled, to facilitate convenient access to the station 10.

Now that the invention has been described,
What is claimed is:

1. A gas flow and pressure regulation and control station to be connected directly between a distribution line of an urban gas distribution network and a user service line; the station comprising:
   an inlet connector structured and disposed to be secured in leak resistant, fluid flow engagement directly with the distribution line,
   an outlet level connector disposed in fluid flow communication with said inlet connector, said outlet level connector including an axial flow through passage having a first end and a second end wherethrough controlled levels of gas pass from said first end to said second end,
   a delivery connector connected in leak resistant, fluid flow communication with the user service line and structured and disposed to deliver regulated quantities of the gas to the user service line, said regulated quantities of the gas corresponding a tolerable flow and pressure level of gas,
   an intermediary connector disposed between said outlet level connector and said delivery connector, said intermediary connector including an expansion chamber and having regulating means disposed therein,
   said regulating means being structured and disposed to limit and control the gas flow and gas pressure passing to said delivery connector such that a maximum flow rate, based upon a main line supply pressure, is established and the tolerable flow and pressure level of gas into the user service line in accordance therewith is maintained,
   said regulating means including a flow regulation member disposed adjacent said second end of said outlet level connector, and structured to pivotally move between a normal flow stopping orientation and flow passage orientation,
   said flow regulator member including a stopper end and a lever end and being disposed such that said stopper end is disposed in contacting, flow stopping relation with said second end of said outlet level connector, upon said flow regulation member being in said, normal flow stopping orientation, thereby blocking gas flow from said second end of said outlet level connector,
   pivot means structured and disposed to enable said flow regulator member to pivotally move from said normal, flow stopping orientation to said flow passage orientation upon a gas flow and pressure reduction in said intermediary connection due to the passage of gels through said delivery connector into the user service line, said pivotal movement into said flow passage orientation resulting in small, regulated quantities of gas flowing from said outlet level connector into said intermediary connection until said tolerable flow and pressure levels of gas is attained in said intermediary connection causing said flow regulation member to pivot back to its normal, flow stopping orientation,
   said regulating means further including level adjustment means structured and disposed to adjust said tolerable flow and pressure levels of gas corresponding said maximum flow rate which must be maintained in said intermediary connection to maintain said flow regulator meter in said normal flow stopping orientation,
   said level adjustment means including a regulator diaphragm, said regulator diaphragm being disposed in said expansion chamber of said intermediary connection so as to enable said regulator diaphragm to function in an atmosphere of closed venting,
   said regulator diaphragm being connected with said flow regulator member so as to resist and regulate pivoting movement of said flow regulator member a quantity based upon flow and pressure levels of gas in said intermediary connection, and
   adjustable tension biasing means disposed within said intermediary connection and secured to said regulator diaphragm so as to adjustably control the gas flow and pressure reduction in said intermediary connection necessary to enable movement of said regulator diaphragm and accordingly pivoting movement of said flow regulator member from said flow stopping orientation, resulting in said small, regulated quantities of gas flow from said outlet level connector flowing into said intermediary connection until said tolerable flow and pressure levels of gas is attained in said intermediary connection.

2. A station as recited in claim 1 wherein said level adjustment means further includes a pivot rod having a distal end hingedly secured to said lever end of said flow regulator member and said regulator diaphragm such that pivotal movement of said flow regulator member results in axial movement of said pivot rod.

3. A station as recited in claim 2 further including a second, backup diaphragm connected to said pivot rod such that if said regulator diaphragm ruptures, said backup diaphragm will begin to function to allow minimal pivoting movement of said flow regulator member from said flow blocking orientation, thereby preventing high flow and pressure levels of gas to enter the user service line and providing a warning that said regulator diaphragm has ruptured due to the low flow and pressure levels of gas being provided to the user service line, and will hermetically seal the intermediary connection below said backup diaphragm.

4. A station as recited in claim 2 wherein said inlet connector includes a pair of clamp members structured and disposed to be clampingly and hermetically secured about a section of the distribution line of the urban gas distribution network, one of said clamp members including flow through passage wherethrough gas passes from the clamped section into the station.

5. A station as recited in claim 2 further including shutoff means disposed between said inlet connector and said outlet level connector so as to stop gas flow therebetween.

6. A station as recited in claim 5 wherein said shutoff means includes a stopper member and an elongate access tube, said stopper member being structured and disposed to be movable into a flow blocking position between said inlet connector and said outlet level connector, and said access tube extending upwardly from between said inlet connector and said outlet level connector to facilitate exterior access to said stopper member.

7. A gas flow and pressure regulation and control station to be connected directly between a distribution line of an urban gas distribution network and a user service line; the station comprising
   an inlet connector structured and disposed to be secured in leak resistant, fluid flow engagement directly with the distribution line,
   an outlet level connector disposed in fluid flow: communication with said inlet connector, said outlet level connector including an axial flow through passage having a first end and a second end wherethrough controlled levels of gas pass from said first end to said second end,
   a delivery connector connected in leak resistant, fluid flow communication with the user service line and structured and disposed to deliver regulated quantities of the gas to the user service line,
   an intermediary connection disposed between said outlet level connector and said delivery connector, said intermediary connector including an expansion chamber and having regulating means disposed therein,
   said regulating means being structured and disposed to limit and control the gas flow and gas pressure passing into said delivery connector such that a maximum flow rate, based upon a main line supply pressure, is established and a tolerable flow and pressure level of gas into the user service line is maintained in accordance therewith,
   said regulating means including a flow regulation member disposed adjacent said second end of said outlet level connector and structured to pivotally move between a normal flow stopping orientation and a flow passage orientation,
   said flow regulator member including a stopper end and a lever end and being disposed such that said stopper end is disposed in contacting, flow stopping relation with said second end of said outlet level connector upon said flow regulator member being in said normal flow stopping orientation, thereby blocking gas flow from said second end of said outlet level connector,
   pivot means structured and disposed to enable said flow regulator member to pivotally move from said normal, flow stopping orientation to said flow passage orientation upon a gas flow and pressure reduction in said intermediary connection due to the passage of gas through said delivery connector into the user service line, said pivotal movement into said flow passage orientation resulting in small, regulated quantities of gas flowing from said outlet level connector into said intermediary connection until said tolerable flow and pressure level corresponding said maximum flow rate is attained in said intermediary connection causing said flow regulator member to pivot back to said normal, flow stopping orientation,
   said regulating means further including level adjustment means structured and disposed to adjust said tolerable flow and pressure levels of gas in accordance with the main supply line pressure,
   said level adjustment means including a pivot rod having a distal end hingedly secured to said lever end of said flow regulator member such that pivotal movement of said flow regulator member results in axial movement of said pivot rod,
   said level adjustment means further including a regulator diaphragm, said regulator diaphragm being disposed in said expansion chamber of said intermediary connection so as to enable said regulator diaphragm to function in an atmosphere of closed venting,
   said regulator diaphragm being fixedly secured to said pivot rod so as to resist and regulate axial movement of said pivot rod, and accordingly pivoting movement of said flow regulator member, a quantity based upon flow and pressure levels of gas in said intermediary connection,
   adjustable tension biasing means disposed within said intermediary connection and secured to said regulator diaphragm so as to adjustably control the gas flow and pressure reduction in said intermediary connection necessary to enable movement of said regulator diaphragm and accordingly axial movement of said pivot rod and pivoting movement of said flow regulator member from said flow stopping orientation, resulting in small, regulated quantities of gas flow from said outlet level connector flowing into said intermediary connection until said tolerable flow and pressure level is attained in said intermediary connection, and
   a second, back-up diaphragm connected to said pivot rod such that if said regulator diaphragm ruptures, said back-up diaphragm will begin to function to allow minimal pivoting movement of said flow regulator member from said flow stopping orientation, thereby preventing high flow and pressure levels of gas from entering the user service line, providing a warning that said regulator diaphragm has ruptured due to the low flow and pressure levels of gas being provided to the user service line, and hermetically sealing the intermediary connection below said second, back-up diaphragm to prevent leakage.

8. A station as recited in claim 7 wherein said adjustable biasing tension means includes a spring having a distal end and a proximal end, said proximal end being secured to said regulator diaphragm and said distal end being secured to an adjustment member adjustably secured in said intermediary connection so as to be moveable to adjust the tension on said regulator diaphragm to correspond said tolerable flow and pressure level of gas.

9. A station as recited in claim 8 wherein said inlet connector includes a pair of clamp members structured and disposed to be clampingly and hermetically secured about a section of the distribution line of the urban gas distribution network, one of said clamp members including flow through passage wherethrough gas passes from the clamped section into the station.

10. A station as recited in claim 2 further including metering means disposed between said inlet connector and said outlet connector so as to the amount of gas utilized.

11. A station as recited in claim 5 wherein said metering means includes a use time meter disposed between said inlet connector and said outlet connector so as to measure the amount of time during which gas is being drawn into the station, said use time correlating into a quantity of gas utilized due to the constant predetermined tolerable flow and pressure levels of gas maintained by said regulating means.

12. A station as recited in claim 11 further including shutoff means disposed between said inlet connector and said outlet level connector so as to stop gas flow therebetween.

13. A station as recited in claim 12 wherein said shut-off means includes a stopper member and an elongate access tube, said stopper member being structured and disposed to be movable into a flow blocking position between said inlet connector and said outlet level connector, and said access tube extending upwardly from between said inlet connector and said outlet level connector to facilitate exterior access to said stopper member.

14. A gas flow and pressure regulation and control station to be connected directly between a distribution line of an urban gas distribution network and a user service line; the station comprising:

- an inlet connector structured and disposed to be secured in leak resistant, fluid flow engagement directly with the distribution line,
- an outlet level connector disposed in fluid flow communication with said inlet connector, said outlet level connector including an axial flow through passage having a first end and a second end wherethrough controlled levels of gas pass from said first end to said second end,
- a delivery connector connected in leak resistant, fluid flow communication with the user service line and structured and disposed to deliver regulated quantities of the gas to the user service line,
- an intermediary connection disposed between said outlet level connector and said delivery connector, said intermediary connector including an expansion chamber and having regulating means disposed therein,
- said regulating means being structured and disposed to limit and control the gas flow and gas pressure passing into said delivery connector such that a maximum flow rate, based upon a main line supply pressure, is established and a tolerable flow and pressure level of gas corresponding the maximum flow rate into the user service line is maintained,
- said regulating means being pre-calibrated based on a particular users maximum consumption requirements so as to limit the gas flow to the user service line to the established maximum flow rate, while simultaneously regulating and controlling the tolerable flow and pressure level of gas passing into the user service line,
- said regulating means including a flow regulation member disposed adjacent said second end of said outlet level connector and structured to pivotally move between a normal flow stopping orientation and a flow passage orientation,
- said flow regulator member including a stopper end and a lever end and being disposed such that said stopper end is disposed in contacting, flow stopping relation with said second end of said outlet level connector upon said flow regulator member being in said normal flow stopping orientation, thereby blocking gas flow from said second end of said outlet level connector,
- pivot means structured and disposed to enable said flow regulator member to pivotally move from said normal, flow stopping orientation to said flow passage orientation upon a gas flow and pressure reduction in said intermediary connection due to the passage of gas through said delivery connector into the user service line, said pivotal movement into said flow passage orientation resulting in small, regulated quantities of gas flowing from said outlet level connector into said intermediary connection until said tolerable flow and pressure level is attained in said intermediary connection causing said flow regulator member to pivot back to said normal, flow stopping orientation,
- said regulating means further including level adjustment means structured and disposed to adjust said tolerable flow and pressure levels of gas in accordance with the main line supply pressure,
- said level adjustment means including a pivot rod having a distal end hingedly secured to said lever end of said flow regulator member such that pivotal movement of said flow regulator member results in axial movement of said pivot rod,
- said level adjustment means further including a regulator diaphragm, said regulator diaphragm being disposed in said expansion chamber of said intermediary connection so as to enable said regulator diaphragm to function in an atmosphere of closed venting,
- said regulator diaphragm being fixedly secured to said pivot rod so as to resist and regulate axial movement of said pivot rod, and accordingly pivoting movement of said flow regulator member, a quantity based upon flow and pressure levels of gas in said intermediary connection,
- adjustable tension biasing means disposed within said intermediary connection and secured to said regulator diaphragm so as to adjustably control the gas flow and pressure reduction in said intermediary connection necessary to enable movement of said regulator diaphragm and accordingly axial movement of said pivot rod and pivoting movement of said flow regulator member from said flow stopping orientation, resulting in small, regulated quantities of gas flow from said outlet level connector flowing into said intermediary connection, and
- a second, back-up diaphragm connected to said pivot rod such that if said regulator diaphragm ruptures, said back-up diaphragm will begin to function to allow minimal pivoting movement of said flow regulator member from said flow stopping orientation, thereby preventing high flow and high pressure levels of gas from entering the user service line, providing a warning that said regulator diaphragm has ruptured due to the low flow and pressure levels of gas being provided to the user service line, and hermetically sealing the intermediary connection below said second, back-up diaphragm so as to prevent leakage.

* * * * *